United States Patent

Avery et al.

(10) Patent No.: US 6,348,437 B1
(45) Date of Patent: Feb. 19, 2002

(54) SILICONE OILS WITH IMPROVED VISCOSITY STABILITY

(75) Inventors: Ragnar Richard Avery, Midland; Jeffrey Scott Baker, Remlock, both of MI (US); Gerald Anthony Beeler, Carrollton, KY (US); Michael Henry Brown, Prospect, KY (US); Kevin James Okeson, Carrollton, KY (US)

(73) Assignee: Dow Corning Corporation, Midland, MI (US)

( * ) Notice: Subject to any disclaimer, the term of this patent is extended or adjusted under 35 U.S.C. 154(b) by 823 days.

(21) Appl. No.: 08/642,019

(22) Filed: May 1, 1996

(51) Int. Cl.$^7$ ............................................. C10M 105/76
(52) U.S. Cl. ....................... 508/208; 508/209; 508/215; 252/77; 252/78.3; 252/78.5
(58) Field of Search ................................ 508/207, 208, 508/209, 215; 252/78.3, 78.5

(56) References Cited

U.S. PATENT DOCUMENTS

| | | | | |
|---|---|---|---|---|
| 2,452,254 A | * | 10/1948 | McGregor et al. | 508/208 |
| 2,491,843 A | * | 12/1949 | Wilcock | 508/207 |
| 2,839,468 A | * | 6/1958 | Stewart et al. | 508/209 |
| 3,340,329 A | * | 9/1967 | Guarnaccio et al. | 508/431 |
| 3,489,567 A | * | 1/1970 | McGraw | 508/209 |
| 4,411,806 A | * | 10/1983 | Tirtiaux et al. | 508/208 |
| 4,443,351 A | | 4/1984 | Keil | 252/75 |
| 4,540,615 A | * | 9/1985 | Poliniak | 508/208 |
| 4,701,273 A | * | 10/1987 | Brady et al. | 508/478 |
| 4,950,415 A | * | 8/1990 | Malito | 508/501 |
| 5,100,568 A | * | 3/1992 | Takahashi et al. | 508/208 |
| 5,130,041 A | * | 7/1992 | Groenhof | 508/208 |
| 5,222,874 A | | 6/1993 | Unnewehr | 417/372 |
| 5,273,670 A | * | 12/1993 | Endies et al. | 508/208 |
| 5,334,319 A | * | 8/1994 | Tomizawa et al. | 508/215 |

OTHER PUBLICATIONS

Encyclopedia of Polymer Science and Engineering, vol. 10, John Wiley & Sons, 1987, pp. 1–19. Month unknown.
Chemical Analysis, vol. 112, A. Lee Smith, 1991, pp. 150–155, 294–303. Month unknown.
Encyclopedia of Chemical Technology, vol. 18, Kirk–Othmer, 1982, pp. 207–228. Month unknown.
Encyclopedia of Polymer Science and Engineering, vol. 7, John Wiley & Sons, 1987, pp. 298–327. Month unknown.

* cited by examiner

Primary Examiner—Margaret Medley
(74) Attorney, Agent, or Firm—Jim L. De Cesare

(57) ABSTRACT

Silicone organic blends for use as lubricating oils, hydraulic fluids, dielectric fluids, coolants, and in compressor or vacuum pump applications, have improved viscosity stability when the polydispersity of the silicone fluids used in these blends, i.e., their molecular weight distribution ($M_w/M_n$), exceeds 1.5. The viscosity rise of the silicone organic blend is less than one centistoke (mm$^2$/s) when aged 14 days in an oven at 100° C., compared to viscosity rises of about 1.3 to over 3.5 centistokes (mm$^2$/s) for commercial silicone organic blends using silicone fluids with polydispersity less than 1.5.

14 Claims, No Drawings

SILICONE OILS WITH IMPROVED VISCOSITY STABILITY

BACKGROUND OF THE INVENTION

This invention is directed to certain silicone organic blends having an unexpected improvement in their viscosity stability, rendering them especially useful as lubricating oils, hydraulic fluids, dielectric fluids, and as coolants or heat transfer media.

Different fluids have different rates of change in viscosity with temperature. The Viscosity Index (VI) is a method for applying a numerical value to this rate of change based on a comparison with the relative rates of change of two arbitrarily selected types of oils that differ widely in this characteristic. A high VI indicates a relatively low rate of change of viscosity with temperature. A low VI indicates a relatively high rate of change of viscosity with temperature. A standard method for calculating the Viscosity Index is described in ASTM D2270.

One of the primary performance features of any fluid for use as a lubricant, hydraulic fluid, dielectric, or coolant, is that it have outstanding flow characteristics at low temperatures and stability at high temperatures, i.e., a high VI.

Silicones have high Viscosity Indexes, some VI's being about 300 or more. For comparison, cycloparaffinic lubricating oils have a VI of 15, while paraffinic lubricating oils have a VI of 100.

In any event, and in spite of the high VI possessed by some silicones, there remains a need for improvement in viscosity stability of silicones and silicone organic blends in many applications as lubricants, hydraulic fluids, dielectrics, or coolants.

The improved viscosity stability of our silicone organic blends enhance their value in general industrial lubricant applications including, for example, their use as hydraulic oils, gear oils, turbine-circulation oils, refrigeration oils, compressor oils, vacuum pump oils, brake fluids, and damping media. In electrical devices, these silicone organic blends are useful as dielectric fluids in convective or forced circulation type capacitors and transformers. They are also useful dielectric fluids in other electrical devices such as electrical cable, rectifiers, electromagnets, switches, fuses, circuit breakers, and as coolants and insulators for dielectric devices such as transmitters and receivers.

In specialty applications, they can function as multipurpose fluids, as in electrically driven compressors or vacuum pumps of the type described in U.S. Pat. No. 5,222,874 (Jun. 29, 1993), where an oil is used to lubricate and cool the moving parts of a compressor, and is also used to cool the stator laminations and windings of the motor driving the compressor.

BRIEF SUMMARY OF THE INVENTION

Our invention relates to a composition which is a blend of (A) about 85–88.5 percent by weight of a polysiloxane having a viscosity of 20–100 centistokes (mm$^2$/s); and (B) 1.5–5.0 percent by weight of a polysiloxane having a viscosity of 200–30,000 centistokes (mm$^2$/s). The remainder of the blended composition to 100% is (C) an organic additive(s) package containing a lubricity improving agent, antifoam agent, and corrosion inhibiting agent. The blend of polysiloxanes (A) and (B) used in the composition has a polydispersity which exceeds 1.5.

Using the above parameters, it is possible to prepare blends of polysiloxanes (A) and (B) having viscosities in the range of about 20–250 centistokes (mm$^2$/s). For example, using 1.5 percent by weight of a polydimethylsiloxane having a viscosity of 200 centistokes (mm$^2$/s) and 85 percent by weight of a polydimethylsiloxane having a viscosity of 20 centistokes (mm$^2$/s) provides a blend having a viscosity of about 21 centistokes (mm$^2$/s). Using 5 percent by weight of a polydimethylsiloxane having a viscosity of 30,000 centistokes (mm$^2$/s) and 85 percent by weight of a polydimethylsiloxane having a viscosity of 200 centistokes (mm$^2$/s) provides a blend having a viscosity of about 250 centistokes (mm$^2$/s). For compressor fluid applications, however, it is preferred that the blends of polysiloxanes (A) and (B) have a viscosity in the range of about 25–30 centistokes (mm$^2$/s).

Preferably, polysiloxane (A) has a polydispersity less than about 1.5, most preferably a polydispersity of about 1.3, although it is possible for polysiloxane (A) to have a polydispersity greater than 1.5. Preferably, polysiloxane (B) has a polydispersity greater than about 1.5, most preferably a polydispersity of about 1.8 to about 3.5. The blend of polysiloxane (A) and polysiloxane (B) preferably has a polydispersity in the range of more than 1.50 to less than about 2.5.

Our invention is also directed to methods of using this composition for (i) transmitting power by applying pressure to the composition confined in a hydraulic system; (ii) lubricating or cooling mechanical, electrical, or electromechanical equipment by circulating and recirculating the composition in the equipment; and (iii) cooling or insulating an electrical device by utilizing the composition in the electrical device as a dielectric coolant or insulating medium.

In these uses, the composition would not contain an additive that would adversely effect its performance, especially as a dielectric or insulating medium, i.e. rendering the composition conductive.

These and other features and objects of the invention will become apparent from a consideration of the detailed description.

DETAILED DESCRIPTION

The molecular weights of silicone fluids with a viscosity less than 5 mm$^2$/s at 77° F./25° C. are generally quite precise, since the fluids are fractionally distilled products and relatively pure molecular species. Above about 5 mm$^2$/s, however, the molecular weights are average values (i.e., $M_w$), since the fluids are residue products and therefore contain a distribution of molecular sizes.

The molecular weight distribution of a polymer sample describes the relative numbers of molecules of all molecular weight values. Averages of molecular weight such as the number-average molecular weight $M_n$, the weight-average molecular weight $M_w$, and the Z-average molecular weight $M_z$, are parameters commonly used to describe the general shape of the molecular weight distribution. A peak weight-average molecular weight $M_w$ or $M_p$ is another parameter also employed. One convenient measure of the molecular weight distribution of a polymer is the ratio of weight-average molecular weight $M_w$ to number-average molecular weight $M_n$, ($M_w/M_n$) or polydispersity of the polymer. For a perfectly uniform monodisperse polymer, this ratio is one.

Methods for measuring molecular weight distribution and molecular weight averages for silicones are the same as for other polymers. Gel Permeation Chromatography (GPC), sometimes termed size exclusion chromatography, is the most common, convenient, and useful method. The technique is based on the separation of polymer molecules in a column packed with porous cross-linked gels (typically polystyrene) according to their size in solution.

When a polymer solution is eluted, the species of higher molecular weight, which permeate the porous polystyrene gel to a lesser degree than the species of lower molecular weight, pass through the column more rapidly and are eluted out first. The system is calibrated and yields an estimated molecular weight distribution for a given sample. The only requirements are that the sample is soluble and stable in a suitable solvent, and that the sample components can be detected by some means in the eluent.

The system is calibrated by injecting dilute solutions of narrow dispersity standards of known molecular weight. The retention volume or retention time of each standard is plotted against the log molecular weight of the standard, and fitted to an equation for a curve. The molecular weight distribution values of a given polymer are then calculated and expressed as relative to the standard.

As used herein, polysiloxane is intended to mean a polymer having the general structure:

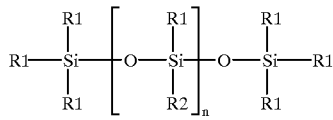

where n has a value to provide polymers with a viscosity in the range of about 20–30,000 mm²/sec. R1 and R2 are alkyl radicals of 1–6 carbon atoms, or an aryl group such as phenyl. Typically, the value of n is about 25–1,250.

Illustrative polysiloxanes are polydimethylsiloxane, polydiethylsiloxane, polymethylethylsiloxane, polymethylphenylsiloxane, and polydiphenylsiloxane. Preferred are polydimethylsiloxanes having a viscosity of 20 mm²/sec; 200 mm²/sec; 350 mm²/sec; 500 mm²/sec; 1,000 mm²/sec; 5,000 mm²/sec; 10,000 mm²/sec; and 30,000 mm²/sec, respectively.

By polydimethylsiloxane (PDMS), we mean a polysiloxane having the above general structure where all R1 and R2 groups are methyl radicals. The PDMS may contain trace amounts of silicon-bonded radicals which occur as impurities in or arise during the preparation of commercial polydiorganosiloxanes, such as silicon-bonded hydroxyl radicals; and unreacted siloxanes such as cyclic polydimethylsiloxanes.

The composition contains, in addition to the PDMS, an organic additive package for enhancing its performance, including a lubricity improving agent, antifoam, and corrosion inhibitor.

The additive for improving lubricity of the composition and which also functions as an antiwear agent is a chlorendate having the formula:

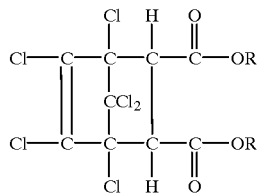

where R is an alkyl radical of 4–12 carbon atoms or the tetrahydrofurfuryl radical.

Suitable alkyl radicals are, for example, butyl, t-butyl, pentyl, hexyl, heptyl, octyl, 2-ethylhexyl, nonyl, decyl, and dodecyl. Preferably, R is butyl, hexyl, octyl, or 2-ethylhexyl. Most preferably, R is 2-ethylhexyl, i.e., di-2-ethylhexyl chlorendate. This additive can be employed in amounts in the range of about 5–15 percent by weight of the composition.

Suitable antifoam additives include perfluoroalkylpolyethers such as products sold under the trademark KRY-TOX® by the E. I. Du Pont de Nemours and Company, Wilmington, Del.; fluorocarbon oils; fluorine-containing amides such as N-(alkylamino-trimethylene)perfluorooctanamides; fluorosilicones such as polytrifluoropropylmethylsiloxane; hydrocarbon fluids such as kerosene; paraffinic and naphthenic mineral oils and vegetable oils such as linseed oil, corn oil, soybean oil, peanut oil, tall oil, and castor oil; liquid fatty alcohols, acids, and esters; and poly(alkylene oxide) derivatives of oils such as ethoxylated rosin oil. This additive can be employed in amounts in the range of about 2–30 parts per million based on the weight of the composition.

Corrosion inhibiting additives include alkyl phosphate amines such as products sold under the tradename AFA-1 by the E. I. Du Pont de Nemours and Company, Wilmington, Del.; substituted succinic anhydrides such as dodecenyl succinic anhydride; sulfur and phosphorous containing materials such as zinc dithiophosphate; amine succinates; alkaline-earth sulfonates such as sodium and calcium sulfonates; dicyclohexyl amines; and polyhydric alcohols. This additive can be employed in amounts in the range of about 0.0005–1 percent by weight of the composition, preferably 0.0005–0.15 percent by weight of the composition.

In addition to the lubricity improving agent, antifoam, and corrosion inhibitor, the composition can contain other additives for enhancing its performance, such as oxidation inhibitors, antiwear agents, friction modifiers, detergents, dispersants, pour-point depressants, pigments, and viscosity improvers.

The composition is prepared by mixing and cold-blending the PDMS fluids and the organic additive package using standard mixing and blending equipment, such as batch mixers, change-can mixers, stationary-tank mixers, double-arm kneading mixers, Banbury mixers, roll mills, colloid mills, propeller mixers, turbine mixers, or homogenizing mixers. Mixing is conducted at room temperature (20–25° C./68–77° F.). The components may be mixed in any order. The time of mixing can vary depending upon mixing equipment, but on average requires a minimum time of about 4–6 hours. A simplified mixing procedure for making small quantities of the composition in less time is to load the ingredients into an empty drum, and roll the drum on a drum roller.

The following examples show our invention in more detail.

EXAMPLE I

We prepared a series of polydimethylsiloxane fluid blends having a polydispersity greater than 1.5 and a viscosity of 25–30 mm²/s by cold blending varying amounts of a 20 mm²/s polydimethylsiloxane fluid having a polydispersity of 1.33 with varying amounts of polydimethylsiloxane fluids having a viscosity of 200 mm²/s; 350 mm²/s; 500 mm²/s; 1,000 mm²/s; 5,000 mm²/s; 10,000 mm²/s; and 30,000 mm²/s, respectively. These PDMS blends are shown in Table I. "PD" in the TABLE is an abbreviation for polydispersity. By way of example, therefore, we blended 4.71% by weight of 200 mm²/s PDMS fluid having a polydispersity of 2.105, with 85.21% by weight of 20 mm²/s polydimethylsiloxane fluid having a polydispersity of 1.33, and obtained a blended PDMS fluid having a viscosity of 25.6 mm²/s and a polydispersity of 1.513.

When the blended PDMS fluid containing an organic additive package was aged for 14 days in an oven at 100° C., the viscosity rise (VR) after two weeks was only 0.79 mm²/s. The organic additive package used in this and the other blends to 100% in Table I consisted of 5–15 percent by weight of lubricity improving additive; 2–30 parts per million of antifoam additive;

and 0.0005–1.0 percent by weight of corrosion inhibiting additive.

The lubricity improving additive was di-2-ethylhexyl chlorendate; the antifoam additive was a perfluoroalkylpolyether sold under the trademark KRYTOX® by the E. I. Du Pont de Nemours and Company, Wilmington, Del.; and the corrosion inhibiting additive was an alkyl phosphate amine in kerosene sold under the tradename AFA-1 by the E. I. Du Pont de Nemours and Company, Wilmington, Del.

As a further example, we blended 2.67% by weight of 1,000 mm$^2$/s PDMS fluid having a polydispersity of 2.081, with 87.25% by weight of 20 mm$^2$/s polydimethylsiloxane fluid having a polydispersity of 1.33, and obtained a blended PDMS fluid having a viscosity of 26.2 mm$^2$/s and a polydispersity of 1.63. When the blended PDMS fluid containing the organic additive package described above was aged for 14 days in an oven at 100° C., the viscosity rise (VR) after two weeks was only 0.56 mm$^2$/s.

The viscosity of the PDMS fluids and blends was determined using a glass capillary viscometer. Kinematic viscosity of the PDMS fluids and blends was determined by measuring the time required for a fixed volume of the sample to pass through a calibrated glass capillary using gravity-flow. The method is based on the American Society For Testing And Materials (ASTM), Philadelphia, Penn., ASTM D 445–94, "Standard Test Method for Kinematic Viscosity of Transparent and Opaque Liquids (the Calculation of Dynamic Viscosity)". The polydispersity (PD) or $M_w/M_n$ of the PDMS fluids and blends was determined by standard Gel Permeation Chromatography (GPC) analysis. Thus, a mixed bed column was calibrated by determining peak retention times for a series of narrow molecular weight distribution standards of a given composition, i.e., polystyrene.

Samples for analysis were prepared as 0.25% weight/volume solutions of the PDMS fluid or blend in toluene. Retention times were recorded; values of $M_n$, $M_w$, and $M_z$, were calculated using standard chromatography software packages; and results verified by comparison against the standards.

Ideally, no viscosity rise is desirable. However, we found that viscosity rise of the silicone organic blends in Table I could be controlled by controlling the polydispersity of the silicone fluids used in these blends, to the point where negative viscocity rises were observed. Thus, an optimum polydispersity occurs at about 1.7, at least for the particular silicone organic blends in Table I.

EXAMPLE II

For purposes of comparison, we selected at random four lots of comercial 50 mm$^2$/s polydimethylsiloxane fluids containing a similar organic additive package used in compressor fluid lubricanting applications. Polydispersity of the four lots of 50 mm$^2$/s PDMs fluid was determined by GPC to be 1.364, 1.394, 1.474, and 1.74. Each of the four lots of PDMS fluid containing the additive package was heat aged 14 days in an oven at 100° C. The two week viscosity rise of the four lots of PDMS fluid containing the organic additive package was determined to be 3.64 m$^2$/s, 2.96 mm$^2$/s, 1.29 mm$^2$/s, and 1.66 mm$^2$/s, respectively, as shown in Table II.

TABLE II

50 CENTISTOKE POLYDIMETHYLSILOXANE

| Lot Number | Polydispersity | Two Week Viscosity Rise |
|---|---|---|
| 1 | 1.364 | 3.64 mm$^2$/s |
| 2 | 1.394 | 2.96 mm$^2$/s |
| 3 | 1.474 | 1.29 mm$^2$/s |
| 4 | 1.474 | 1.66 mm$^2$/s |

EXAMPLE III

We conducted field trials using a rotary screw compressor generally of the construction shown in U.S. Pat. No. 5,2228,74 operating at about 100° C. The fluid used to provide lubrication for the rotary screw compressor and for cooling the moving parts of the rotary screw compressor was a

TABLE I

BLENDING TO OBTAIN CONSTANT VISCOSITY FLUID OF 25–30 CENTISTOKES

| OTHER PDMS FLUID | PERCENT BY WEIGHT OF 20 CENTISTOKE POLYDIMETHYLSILOXANE WITH POLYDISPERSITY OF 1.33 ADDED TO OTHER PDMS FLUID | | | | | | |
|---|---|---|---|---|---|---|---|
| | 85.21 | 85.92 | 86.59 | 87.25 | 87.92 | 88.25 | 88.46 |
| 200 cs PD 2.105 4.71% | 25.6 cs PD 1.513 .79 cs VR | | | | | | |
| 350 cs PD 1.873 4.00% | | 26.1 cs PD 1.59 .61 cs VR | | | | | |
| 500 cs PD 1.937 3.33% | | | 26.1 cs PD 1.59 .58 cs VR | | | | |
| 1,000 cs PD 2.081 2.67% | | | | 26.2 cs PD 1.63 .56 cs VR | | | |
| 5,000 cs PD 2.957 2.00% | | | | | 27.3 cs PD 1.74 −.35 cs VR | | |
| 10,000 cs PD 2.416 1.67% | | | | | 27.3 cs PD 1.74 −.49 cs VR | | |
| 30,000 cs PD 3.442 1.50% | | | | | | | 28.3 cs PD 2.13 −.96 cs VR | polydimethylsiloxane fluid of the type shown in Table I blended from 20 mm²/s PDMS fluid and 350 mm²/s PDMS fluid and having a polydispersity of 1.59.

The fluid contained an organic additive package of the type described above. When compared with the performance of the commercial 50 mm²/s polydimethylsiloxane fluids in Example II, we found that compositions according to our invention provided improved viscosity stability, to the extent that the viscosity of our lubricant remained constant for the duration of the trials.

Other variations may be made in compounds, compositions, and methods described herein without departing from essential features of the invention. The forms of invention are exemplary and not limitations on its scope as defined in the appended claims.

What is claimed is:

1. A composition comprising a blend of (A) at least about 85 percent by weight of a polysiloxane having a viscosity of 20–100 mm²/s at 25° C. as determined by ASTM D 445–94; (B) 1.5–5.0 percent by weight of a polysiloxane having a viscosity of 200–30,000 mm²/s at 25° C. as determined by ASTM D 445–94; the polydispersity of the blend of polysiloxane (A) and polysiloxane (B) having a value which exceeds 1.5 as determined at 25° C. by Gel Permeation Chromatography; and the remainder of the composition to 100 percent being (C) an additive comprising a lubricity improving agent, an antifoam agent, and a corrosion inhibiting agent; the viscosity rise of the composition being less than one mm²/s when aged 14 days in an oven at 100° C., as determined by ASTM D 445–94; polysiloxanes (A) and (B) having the structure:

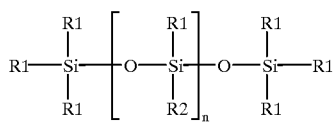

where n has a value to provide polysiloxanes (A) and (B) with a viscosity in the range of 20–100 mm²/s and 200–30,000 mm²/s at 25° C. respectively: and R1 and R2 are alkyl radicals of 1–6 carbon atoms.

2. A method of cooling or insulating an electrical device comprising utilizing in the device as dielectric coolant or insulating medium a composition according to claim 1.

3. A composition comprising a blend of (A) at least about 85 percent by weight of a polysiloxane having a viscosity of 20–100 mm²/s at 25° C. as determined by ASTM D 445–94; (B) 1.5–5.0 percent by weight of a polysiloxane having a viscosity of 200–30,000 mm²/s at 25° C. as determined by ASTM D 445–94; the polydispersity of the blend of polysiloxane (A) and polysiloxane (B) having a value which exceeds 1.5 as determined at 25° C. by Gel Permeation Chromatography; and the remainder of the composition to 100 percent being (C) an additive comprising a lubricity improving agent, an antifoam agent, and a corrosion inhibiting agent; the viscosity rise of the composition being less than one mm²/s when aged 14 days in an oven at 100° C., as determined by ASTM D 445–94; polysiloxanes (A) and (B) having the structure:

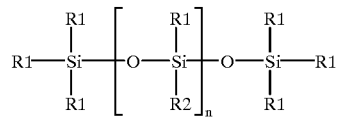

where n has a value to provide polysiloxanes (A) and (B) with a viscosity in the range of 20–100 mm²/s and 200–30,000 mm²/s at 25° C. respectively; and R1 and R2 are alkyl radicals of 1–6 carbon atoms; the composition having a viscosity of 20–250 mm²/s at 25° C.

4. A composition according to claim 1 in which polysiloxane (A) is a polydimethylsiloxane having a polydispersity less than about 1.5 and a viscosity of 20 mm²/sec at 25° C.

5. A composition according to claim 4 in which polysiloxane (B) is a polydimethylsiloxane having a polydispersity greater than about 1.5 and a viscosity selected from the group consisting of 200 mm²/s; 350 mm²/s; 500 mm²/s; 1,000 mm²/s; 5,000 mm²/s; 10,000 mm²/s; and 30,000 mm²/s; at 25° C. respectively.

6. A composition according to claim 1 containing 85–88.5 percent by weight of polysiloxane (A); 1.5–5.0 percent by weight of polysiloxane (B); 5–15 percent by weight of the lubricity improving agent; 2–30 parts per million of the antifoam agent; and 0.0005–1.0 percent by weight of the corrosion inhibiting agent.

7. A composition according to claim 6 containing 0.0005–0.15 percent by weight of an alkyl phosphate amine as the corrosion inhibiting agent.

8. A composition according to claim 1 in which polysiloxane (A) has a polydispersity of about 1.3.

9. A composition according to claim 1 in which polysiloxane (B) has a polydispersity of about 1.8 to about 3.5.

10. A composition according to claim 1 in which the blend of polysiloxane (A) and polysiloxane (B) has a polydispersity of more than 1.50 to less than about 2.5.

11. A composition according to claim 1 in which the composition has a viscosity of about 20–250 mm²/s at 25° C.

12. A method of transmitting power comprising applying pressure to a composition according to claim 1 confined in a hydraulic system.

13. A method of lubricating or cooling mechanical, electrical, or electromechanical equipment comprising circulating and recirculating in the equipment a composition according to claim 1.

14. A method according to claim 13 in which the equipment is a compressor or vacuum pump.

* * * * *